US 8,496,415 B2

(12) United States Patent
Zitzlaff et al.

(10) Patent No.: US 8,496,415 B2
(45) Date of Patent: Jul. 30, 2013

(54) NEGATIVE INSERT HAVING DOUBLE-POSITIVE CLEARANCE SURFACE

(75) Inventors: Wolfgang Zitzlaff, Kirchheim/Teck (DE); Raouf Ben Amor, Lorch (DE); Zvonko Blazevski, Ebersbach/Fils (DE); Gerd Schöllhammer, Göppingen (DE); Erdal Karatas, Uhingen (DE)

(73) Assignee: CeramTec GmbH, Plochingen (DE)

( * ) Notice: Subject to any disclaimer, the term of this patent is extended or adjusted under 35 U.S.C. 154(b) by 258 days.

(21) Appl. No.: 12/664,404

(22) PCT Filed: Jun. 17, 2008

(86) PCT No.: PCT/EP2008/057630
§ 371 (c)(1),
(2), (4) Date: Jun. 24, 2010

(87) PCT Pub. No.: WO2008/155331
PCT Pub. Date: Dec. 24, 2008

(65) Prior Publication Data
US 2010/0266354 A1    Oct. 21, 2010

(30) Foreign Application Priority Data
Jun. 21, 2007   (DE) .................. 10 2007 029 071

(51) Int. Cl.
*B23C 5/00*   (2006.01)
*B23C 5/02*   (2006.01)

(52) U.S. Cl.
USPC .......................................... 407/113; 407/114

(58) Field of Classification Search
USPC ..................... 407/113, 114, 115, 116, 103
See application file for complete search history.

(56) References Cited

U.S. PATENT DOCUMENTS

| | | | |
|---|---|---|---|
| 3,490,117 A | | 1/1970 | Hertel |
| 5,382,118 A | * | 1/1995 | Satran et al. .................. 407/42 |
| 5,695,303 A | * | 12/1997 | Boianjiu et al. ............. 407/114 |
| 6,227,772 B1 | * | 5/2001 | Heinloth et al. ............. 407/113 |
| 7,008,148 B2 | * | 3/2006 | Wiman et al. ................. 407/113 |
| 7,922,427 B2 | * | 4/2011 | Spitzenberger et al. ...... 407/104 |
| 2004/0013478 A1 | * | 1/2004 | Dehn et al. .................. 407/113 |
| 2005/0186039 A1 | | 8/2005 | Muller et al. |
| 2007/0160432 A1 | | 7/2007 | Eder et al. |

FOREIGN PATENT DOCUMENTS

| | | |
|---|---|---|
| CA | 2 536 445 | 3/2005 |
| DE | 197 04 931 C1 | 3/1998 |
| DE | 10 2005 025815 A1 | 12/2006 |
| EP | 1 380 375 A | 1/2004 |
| EP | 1 536 903 B | 2/2007 |
| WO | WO 03/013770 | 2/2003 |
| WO | WO 2005/021192 | 3/2005 |

* cited by examiner

*Primary Examiner* — Will Fridie, Jr.
(74) *Attorney, Agent, or Firm* — Fulbright & Jaworski LLP

(57) ABSTRACT

A negative insert has double-positive clearance surface.

9 Claims, 4 Drawing Sheets

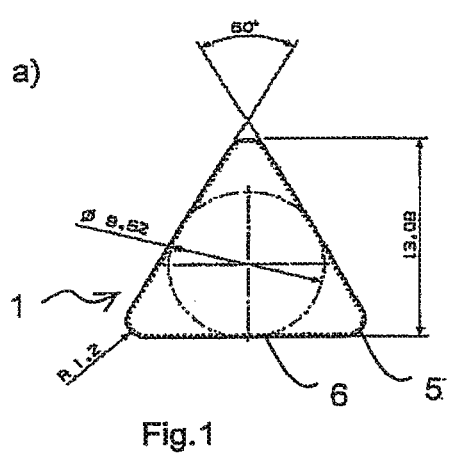
Fig. 1
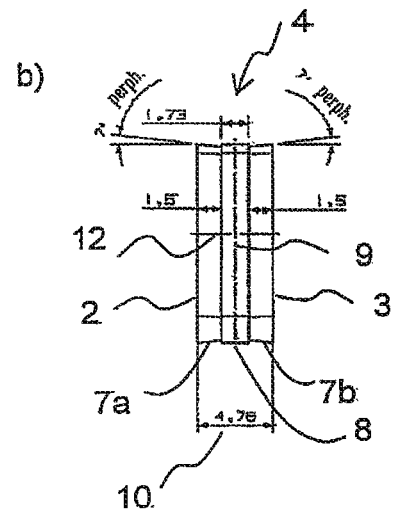
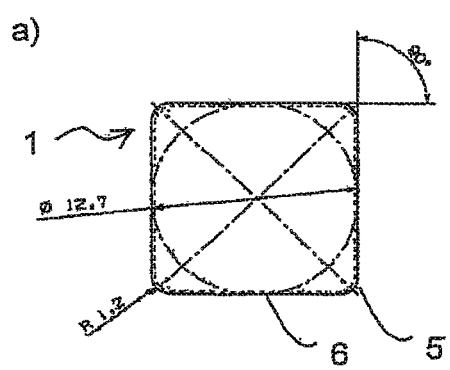
Fig. 2
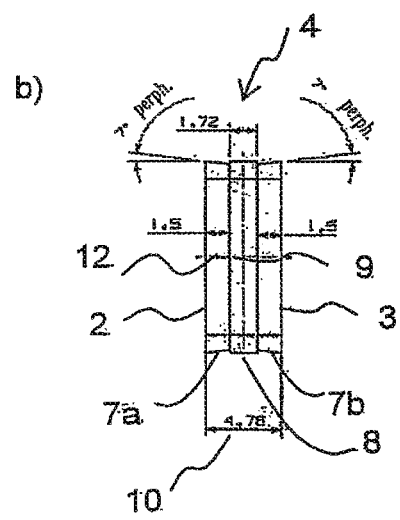

NEGATIVE INSERT HAVING DOUBLE-POSITIVE CLEARANCE SURFACE

This application is a §371 of PCT/EP2008/057630 filed Jun. 17, 2008, and claims priority from DE 10 2007 29071.5 filed Jun. 21, 2007.

FIELD OF THE INVENTION

The invention relates to an indexing cutting insert for installation in tool holders for machining workpieces, having an upper side and a lower side and a peripheral geometry connecting the upper side and the lower side, wherein cutter corners and cutter edges are arranged at the transition between the upper side and lower side and the peripheral geometry, and the peripheral geometry has positive tool flanks which run around below the cutter corners and cutter edges on both sides and which are retracted or undercut in relation to the cutter corners and cutter edges, as a result of which a clearance angle which is positive on both sides is produced.

BACKGROUND OF THE INVENTION

According to the prior art, ceramic cutting inserts are typically made with a clearance angle $\alpha$ of 0° or with a clearance angle $\alpha>0°$.

If the clearance angle $\alpha=0°$, the cutting insert may be used on both sides, and cutter corners and cutter edges are available on the upper side and the lower side. In the case of a rectangular cutting insert, for example, four cutter edges and cutter corners are available on the upper side and four on the lower side, that is a total of eight cutter edges and cutter corners.

If the clearance angle $\alpha>0°$, the cutting insert can only be used on one side, as a result of which the number of usable cutter corners or cutter edges is halved by comparison with the construction in which the clearance angle $\alpha=0°$.

The generic document U.S. Pat. No. 3,490,117 discloses an indexing cutting insert which has positive tool flanks which run around the peripheral geometry below the cutter corners and cutter edges on both sides and which are undercut in relation to the cutter corners and cutter edges, as a result of which a clearance angle which is positive on both sides is produced. The disadvantage of this is that this indexing cutting insert for clamping to tool holders need a seat for the insert which is adapted to the peripheral geometry of the cutting insert, as a result of which they cannot be installed in conventional clamp holders. This means that exchangeability and application are restricted and made more difficult.

OBJECTS OF THE INVENTION

The object of the invention is to improve an indexing cutting insert according to the present invention so that it can be used in conventional clamp holders without sacrificing the features and advantages of a positive tool flank.

SUMMARY OF THE INVENTION

According to the invention, this object is achieved in that there is arranged, between two tool flanks that are opposed on the peripheral geometry in relation to the upper side and lower side, a collar which is raised in relation to the most recessed points on the tool flanks and whose surface serves as an abutment face in tool holders. This makes installation in conventional clamp holders possible without sacrificing the features and advantages of a positive tool flank.

In an embodiment, the collar is constructed to run around the peripheral geometry, as a result of which the abutment face is maximised and installation can be in any possible orientation.

In a preferred embodiment, the indexing cutting insert is made of a ceramic. Ceramics, in particular, result in an extremely long service life for the cutting insert.

In an embodiment in accordance with the invention, the length of the tool flanks is less than half the thickness of the indexing cutting insert. As a result of this, the collar may be arranged centrally on the peripheral geometry and also has sufficient width.

To strengthen the cutter edges and cutter corners, in an embodiment the tool flanks in the abutment region that is directly adjacent to the cutter edges and cutter corners are constructed to be substantially at a right angle to the upper side and lower side of the indexing cutting insert. As a result of this, the cutting insert can abut against abutment faces in the tool holder both by means of the two abutment regions and by means of the raised collar. This abutment region at the same time strengthens the cutter corners and the cutter edges.

In an embodiment of the invention, the surface of the collar is located, with respect to the longitudinal axis of the indexing cutting insert, at the same or at a greater radial height than that of the cutter edges and cutter corners. This means that the cutting insert may abut against abutment faces in the tool holder in any desired manner.

In an embodiment of the invention, the abutment region of the tool flanks and the surface of the collar are located, with respect to the longitudinal axis of the indexing cutting insert, at the same radial height, or the radial height of the surface of the collar, with respect to the longitudinal axis of the indexing cutting insert, is greater than the radial height of the abutment region of the tool flanks.

In an embodiment, the tool flanks are shaped by peripheral grinding. In another embodiment, the tool flanks are shaped by appropriate pressing of the green body and then sintering. The second embodiment relates to cutting inserts made of a ceramic.

The invention will be explained in more detail below with reference to figures.

FIG. 8 shows a cutting insert according to the prior art. Only three cutter corners 5 and three cutter edges 6 are available in total.

BRIEF DESCRIPTION OF THE FIGURES

FIG. 1*a* is a plan view of an embodiment of the invention.
FIG. 1*b* is a view of the peripheral geometry of the embodiment shown in FIG. 1*a*.
FIG. 2*a* is a plan view of an embodiment of the invention.
FIG. 2*b* is a view of the peripheral geometry of the embodiment shown in FIG. 2*a*.

DETAILED DESCRIPTION

Figure 3:
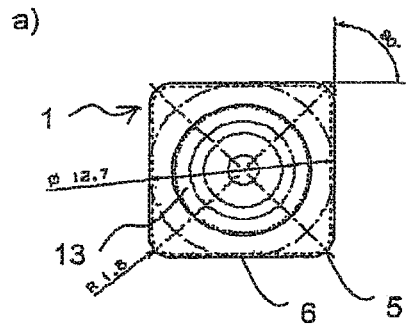
FIG. 3*a* is a plan view of an embodiment of the invention.
FIG. 3*b* is a view of the peripheral geometry of the embodiment shown in FIG. 3*a*.
Figure 3:
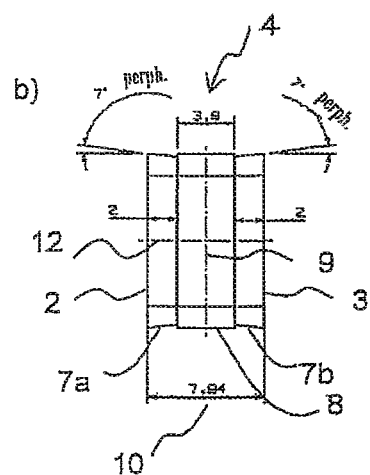

FIGS. 1 to 7 each show an indexing cutting insert 1 in accordance with the invention, namely in plan view (FIGS. 1*a*, 2*a*, 3*a*, 4*a*, 5*a*, 6*a*) and as a view of the respective peripheral geometry (FIGS. 1*b*, 2*b*, 3*b*, 4*b*, 5*b*, 6*b*, 6*c*). Like reference numerals designate like articles.

All the indexing cutting inserts 1 in accordance with the invention, whether triangular, square, rectangular, cubic or round in form, have an upper side 2 and a lower side 3, though these are of identical construction. Hollows 13 may be shaped in the two sides 2, 3, for securing to a cutting tool. A preferred hollow will be described below.

The two sides 2, 3 are connected to one another by way of a peripheral geometry 4. At the transition between the sides 2, 3 and the peripheral geometry there are arranged cutter corners 5 and cutter edges 6 which are used for machining metal workpieces.

So that the indexing cutting inserts 1 have the greatest possible number of these cutter corners 5 and cutter edges 6, the peripheral geometry 4 is undercut by way of two tool flanks 7*a*, 7*b*, so that a clearance angle which is positive on both sides is produced.

The invention thus describes an indexing cutting insert 1 which in addition to the features of a negative cutting insert that are standardised by DIN/ISO (clearance angle=0°), or other known features such as a clearance angle which runs around on both sides below the cutter edge 6, has an essential inventive feature which makes it possible furthermore to use this novel indexing cutting insert 1 in conventional clamp holders or cutting tools without sacrificing the other known features and advantages of a positive clearance angle.

Indexing cutting inserts according to the prior art need, for clamping to tool holders, a seat for the insert which is adapted to the peripheral geometry 4, as a result of which exchangeability and application are complicated and made more difficult.

This invention utilises the option of the peripheral positive tool flanks 7*a*, 7*b*, without the tool flanks 7, 7*b* provided on both sides meeting at the most recessed point on the periphery of the cutting body or peripheral geometry. In accordance with the invention, the length of the tool flanks 7*a*, 7*b* is less than half the thickness 10 of the indexing cutting insert 1, and then extends outwards, generally at a right angle to the tool flank 7*a*, 7*b*. This makes it possible to leave a raised collar 8, or a surface 9 of the collar 8 arranged in the centre of the peripheral geometry. This surface 9, which extends along the periphery, serves as an abutment face for the indexing cutting insert 1 in conventional tool holders. In principle, this cutting body or indexing cutting insert in accordance with the invention is equivalent, at least in its function of clamping on a tool holder, to a commercially available DIN/ISO indexing cutting insert. The reference numeral 12 in the Figures designates the longitudinal axis of the indexing cutting insert 1.

FIG. 6*d* shows that, in an inventive embodiment, the tool flanks 7*a*, 7*b* are constructed in the abutment region 11 directly adjoining the cutter edges 6 and cutter corners 5, substantially at a right angle to the upper side 2 and lower side 3 of the indexing cutting insert 1. This strengthens the cutter corners 5 and cutter edges 5, as a result of which the cutter edges and cutter corners break less often.

However, the function of this indexing cutting insert 1 in accordance with the invention includes the features of a positive indexing cutting insert with the particular advantage that twice as many cutter corners are available than in commercially available positive indexing cutting inserts.

In accordance with the invention, this double-positive tool flank 7*a*, 7*b* may be applied to negative indexing cutting inserts 1 by peripheral grinding. Application is also possible by means of pressing and sintering, in press tools with appropriate slide means.

The clearance angle (reference numeral α, see FIG. 6*c*) on a cutting tool describes the angle of the clearance between the tool and the machined surface during machining. It is significant in typical operations such as lathing and milling, and reduces friction between the two parts.

The clearance angle is always selected to be of precisely such a size that the tool cuts with sufficient free space, depending on the material. A small angle is selected with hard materials that are readily machinable, such as high-alloy steels, whereas a large clearance angle is selected with soft, plastically deformable materials such as plastics.

The clearance angle is formed by the cutter plane and the tool flank, and is measured at a right angle to the feed-side cutting edge. Together with the wedge angle, it forms the cutting angle. The clearance angle, wedge angle and machining angle always add up to 90°.

The invention thus describes a modification to the tool flank which makes it possible also to make cutting inserts with a clearance angle α>0° without reducing the number of usable cutter corners (by comparison with a clearance angle of 0°).

The tool flanks are modified, as illustrated in the figures, by producing a clearance angle α which is positive on both sides. This means that the peripheral geometry 4 is pinched or narrowed towards the centre of the insert. This narrowing appears on both sides of a collar 8 and is preferably located in the centre of the insert.

The invention is thus characterised in that the peripheral geometry of the side faces or tool flanks is undercut in relation to the cutter corners 5 and cutter edges 6. In the centre of the cutting insert 1 there is a peripheral collar 8, with two narrowed portions or tool flanks 7*a*, 7*b* being located on the peripheral geometry 4. The tool flanks 7*a*, 7*b* preferably extend in a straight line, but may also be irregular in form. The only important point is that the clearance angle with the upper side 2 and/or lower side 3 of the indexing cutting insert 1 is positive.

In an inventive embodiment, the clearance angle α is between 3° and 30°, preferably 12°.

FIGS. 1, 2, 6 and 7 show indexing cutting inserts 1 having a planar and uninterrupted upper side 2 and lower side 3. The indexing cutting inserts may also have a hollow 13 or a central bore 10.

Figure 4:
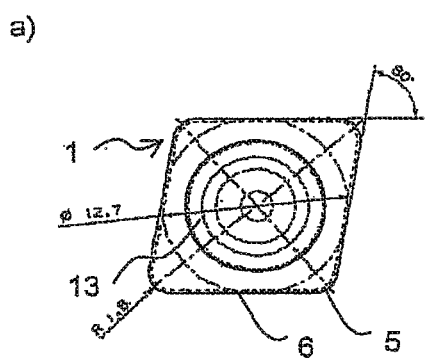
FIG. 4*a* is a plan view of an embodiment of the invention.
FIG. 4*b* is a view of the peripheral geometry of the embodiment shown in FIG. 4*a*.
Figure 4:
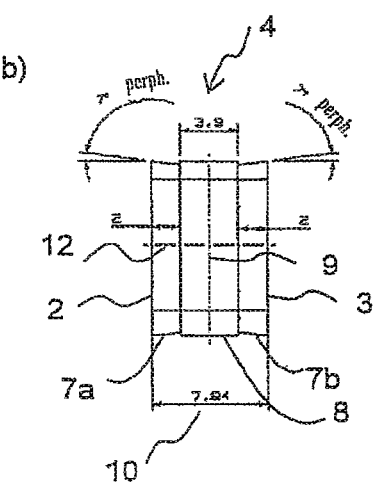
Figure 5:
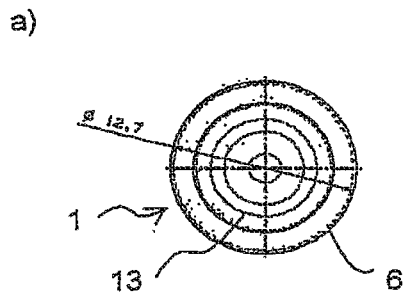
FIG. 5*a* is a plan view of an embodiment of the invention.
FIG. 5*b* is a view of the peripheral geometry of the embodiment shown in FIG. 5*a*.
Figure 5:
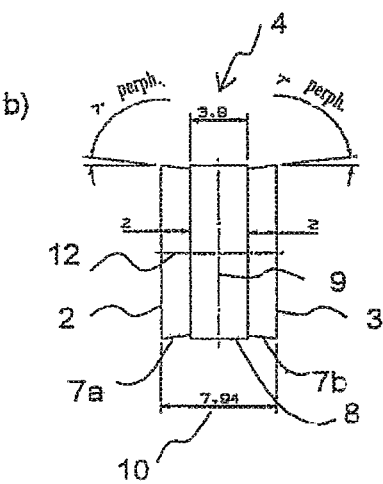
Figure 6:
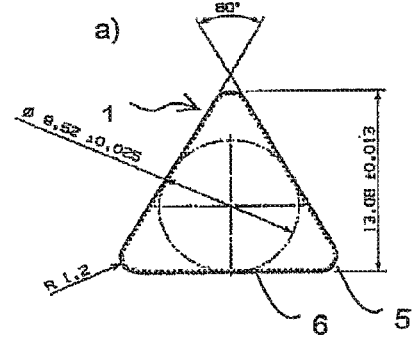
FIG. 6*a* is a plan view of an embodiment of the invention.
FIG. 6*b* is a view of the peripheral geometry of the embodiment shown in FIG. 6*a*.
FIG. 6*c* shows the clearance angle on a cutting tool of the invention according to FIG. 6*a*.
FIG. 6*d* shows that, in an inventive embodiment, the tool flanks are constructed in the abutment region directly adjoining the cutter edges and cutter corners, substantially at a right angle to the upper side and lower side of the indexing cutting insert.
Figure 6:
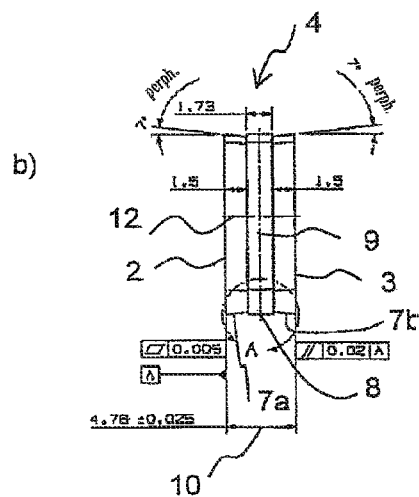
Figure 6:
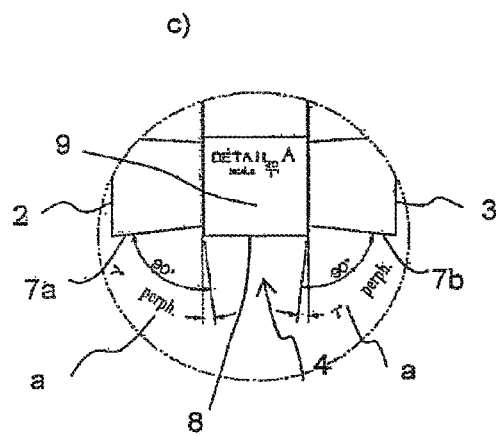
Figure 6:
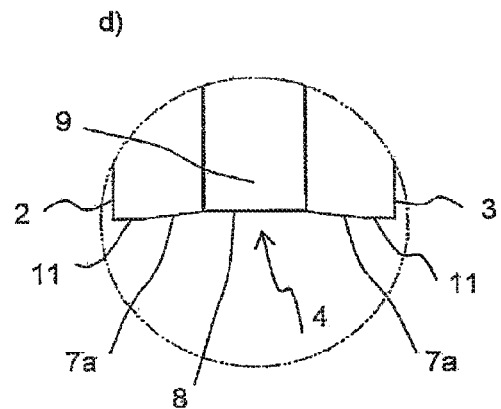
Figure 7:
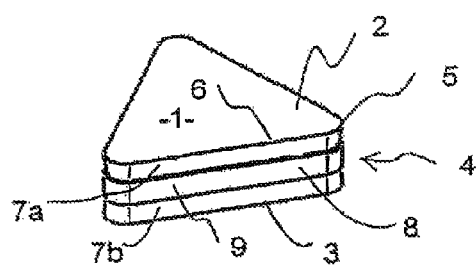
FIG. 7 is an embodiment of the invention having a planar and uninterrupted upper side and lower side.
Figure 8:
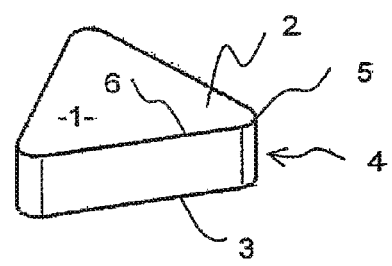
FIG. 8 is a cutting insert according to the prior art.

In the embodiment according to FIGS. 3, 4 and 5, a hollow 13 which is described in WO 03/013770 A1 is shaped therein. The hollow 13 is circular in form and has a spherical or circular elevation in the centre. Preferably, the top of the elevation lies above the base of the hollow and below the upper side of the cutting insert. For clamping to a cutting tool, a clamping claw having an adapted shaped lug engages form-fittingly in the hollow 13 in the cutting insert 1. This hollow 13 serves for form-fitting clamping to a holder body. This cutting insert having the particular hollow 13 is particularly suitable for cuts with high drag, when the cutting insert may be pulled out of its seat by the cutting forces operating. For a further description of this hollow 13, see the cited printed specification.

So that lapping or grinding work by the cutting insert upper sides does not affect the clamping properties of the cutting insert 1, in another embodiment in accordance with the invention the hollow 13 is constructed as described in EP 1 536 903 B1. In this case, a first clamping hollow for clamping is shaped in the cutting tool, and there is arranged coaxially with respect to the first clamping hollow a second clamping hollow, the first clamping hollow being arranged recessed further than the second clamping hollow and both being arranged recessed further than the cutting insert upper side. When this cutting insert is clamped in a tool, a clamping claw of the tool lies on the second clamping hollow and engages, for example by means of a lug, in the first clamping hollow. The spacing between the abutment face of the clamping claw and the hollow is thus always constant, and is not dependent on lapping or grinding work of the cutting insert upper sides.

In an embodiment in accordance with the invention, the cutting insert is made of PCBN or CBN. This is described in WO 2005/021192 A1. The clamping hollow may, once again, be circular in form and have a spherical or circular elevation in the centre, as just described. The corresponding contour of the clamping hollow is preferably shaped by way of a corresponding shaping of the green body, and the green body made in this way is then dried and sintered.

The cutting insert may also be provided with a coating.

The invention claimed is:

1. An indexing cutting insert for installation in tool holders for machining workpieces, comprising:
    a planar and uninterrupted upper side;
    a planar and uninterrupted lower side;
    a peripheral geometry connects the upper side and the lower side and having a first and a second positive tool flank therein;
    a collar;
    a plurality of cutter corners;
    a plurality of cutter edges;
    wherein the cutter corners and cutter edges are arranged at a transition between the upper side and lower side and the peripheral geometry;
    wherein the first and second positive tool flanks undercut the peripheral geometry producing clearance angles ($\alpha$) which are positive, and
    wherein the collar is arranged between the two tool flanks which is raised in relation to the most recessed points on the first and second positive tool flanks.

2. An indexing cutting insert according to claim 1, wherein the collar is constructed to run around the peripheral geometry.

3. An indexing cutting insert according to claim 1, wherein the indexing cutting insert comprises a ceramic.

4. An indexing cutting insert according to claim 1, wherein the length of the tool flanks is less than half the thickness of the indexing cutting insert.

5. An indexing cutting insert according to claim 1, wherein the tool flanks in the abutment region that is directly adjacent to the cutter edges and cutter corners are substantially at right angles to the upper side and lower side of the indexing cutting insert.

6. An indexing cutting insert according to claim 1, wherein the surface of the collar is located, with respect to a longitudinal axis of the indexing cutting insert, at the same or at a greater radial height than that of the cutter edges and cutter corners.

7. An indexing cutting insert according to claim 5, wherein the abutment region of the tool flanks and the surface of the collar are located, with respect to the longitudinal axis of the indexing cutting insert, at the same radial height, or the radial height of the surface of the collar, with respect to the longitudinal axis of the indexing cutting insert, is greater than the radial height of the abutment region of the tool flanks.

8. An indexing cutting insert according to claim 1, wherein the tool flanks are shaped by peripheral grinding.

9. An indexing cutting insert according to claim 1, wherein the tool flanks are shaped by appropriate pressing of a green body and then sintering.

* * * * *